United States Patent
Smith et al.

(10) Patent No.: US 8,031,198 B1
(45) Date of Patent: Oct. 4, 2011

(54) APPARATUS AND METHOD FOR SERVICING MULTIPLE GRAPHICS PROCESSING CHANNELS

(75) Inventors: Jeffrey M. Smith, Union City, CA (US); Shail Dave, San Jose, CA (US); Wei-Je Huang, Fremont, CA (US); Lincoln G. Garlick, Santa Clara, CA (US); Paolo E. Sabella, San Francisco, CA (US)

(73) Assignee: Nvidia Corporation, Santa Clara, CA (US)

( * ) Notice: Subject to any disclaimer, the term of this patent is extended or adjusted under 35 U.S.C. 154(b) by 988 days.

(21) Appl. No.: 11/555,078

(22) Filed: Oct. 31, 2006

(51) Int. Cl.
*G06F 15/00* (2006.01)
*G06T 1/00* (2006.01)
*G06T 15/00* (2011.01)

(52) U.S. Cl. ........................................ 345/501; 345/522
(58) Field of Classification Search .................... 345/501
See application file for complete search history.

(56) References Cited

U.S. PATENT DOCUMENTS

| | | | | |
|---|---|---|---|---|
| 5,613,114 | A * | 3/1997 | Anderson et al. | 718/108 |
| 6,957,326 | B1 * | 10/2005 | Redington et al. | 712/228 |
| 2002/0065865 | A1 * | 5/2002 | Gilbert | 709/102 |
| 2004/0160446 | A1 * | 8/2004 | Gosalia et al. | 345/503 |
| 2007/0300231 | A1 * | 12/2007 | Aguilar et al. | 718/104 |

* cited by examiner

*Primary Examiner* — Kee M Tung
*Assistant Examiner* — Jacinta M Crawford
(74) *Attorney, Agent, or Firm* — Cooley LLP

(57) ABSTRACT

An apparatus and method for servicing multiple graphics processing channels are described. In one embodiment, a graphics processing apparatus includes a scheduler configured to direct servicing of a graphics processing channel by issuing an index related to the graphics processing channel. The graphics processing apparatus also includes a processing core connected to the scheduler. The processing core is configured to service the graphics processing channel by: (i) correlating the index with a memory location at which an instance block for the graphics processing channel is stored; and (ii) accessing the instance block stored at the memory location.

9 Claims, 2 Drawing Sheets

APPARATUS AND METHOD FOR SERVICING MULTIPLE GRAPHICS PROCESSING CHANNELS

BRIEF DESCRIPTION OF THE INVENTION

The invention relates generally to graphics processing. More particularly, the invention relates to an apparatus and method for servicing multiple graphics processing channels.

BACKGROUND OF THE INVENTION

Advanced Graphics Processing Units ("GPUs") sometimes implement techniques for multitasking. In general, multitasking refers to a technique by which multiple contexts can be serviced using a common processing resource. Typically, multitasking accomplishes this goal by scheduling which context is to be serviced during a particular time interval, while another context waits its turn. In the case of a GPU, each context can be referred to as a graphics processing channel, and multiple graphics processing channels can correspond to distinct threads of execution of the same application program or multiple application programs.

When servicing a particular graphics processing channel, a GPU typically accesses a memory address space assigned to that graphics processing channel. For example, a memory address space can store an instance block, which is a data structure similar to a process control block and represents an execution state of a particular graphics processing channel. In accordance with a conventional multitasking implementation, each graphics processing channel is assigned a respective memory address space within a predetermined memory, such as a frame buffer that is closely associated with a GPU. While use of the frame buffer allows fast access to its contents, the relatively small size of the frame buffer can limit the number of memory address spaces that can be assigned, which, in turn, can limit the number of graphics processing channels that can be defined for the GPU. Unfortunately, application programs utilizing the GPU can sometimes require more than this limited number of graphics processing channels.

It is against this background that a need arose to develop the apparatus and method described herein.

SUMMARY OF THE INVENTION

In one aspect, the invention relates to a graphics processing apparatus. In one embodiment, the graphics processing apparatus includes a scheduler configured to direct servicing of a graphics processing channel by issuing an index related to the graphics processing channel. The graphics processing apparatus also includes a processing core connected to the scheduler. The processing core is configured to service the graphics processing channel by: (i) correlating the index with a memory location at which an instance block for the graphics processing channel is stored; and (ii) accessing the instance block stored at the memory location.

In another embodiment, the graphics processing apparatus includes a channel memory configured to store entries related to graphics processing channels. Each of the entries includes: (i) a pending flag for a respective one of the graphics processing channels; and (ii) a pointer to an instance block for the respective one of the graphics processing channels. The graphics processing apparatus also includes a scheduler connected to the channel memory, and the scheduler is configured to schedule servicing of the graphics processing channels based on the entries.

In another aspect, the invention relates to a graphics processing method. In one embodiment, the graphics processing method includes scheduling a thread of execution by issuing an index related to the thread of execution. The graphics processing method also includes servicing the thread of execution by: (i) mapping the index onto a memory address space related to the thread of execution; and (ii) accessing contents stored in the memory address space.

Other aspects and embodiments of the invention are also contemplated. The foregoing summary and the following detailed description are not meant to restrict the invention to any particular embodiment but are merely meant to describe some embodiments of the invention.

BRIEF DESCRIPTION OF THE DRAWINGS

For a better understanding of the nature and objects of some embodiments of the invention, reference should be made to the following detailed description taken in conjunction with the accompanying drawings, in which.

Like reference numerals are used to refer to corresponding components of the drawings.

DETAILED DESCRIPTION

Figure 1:
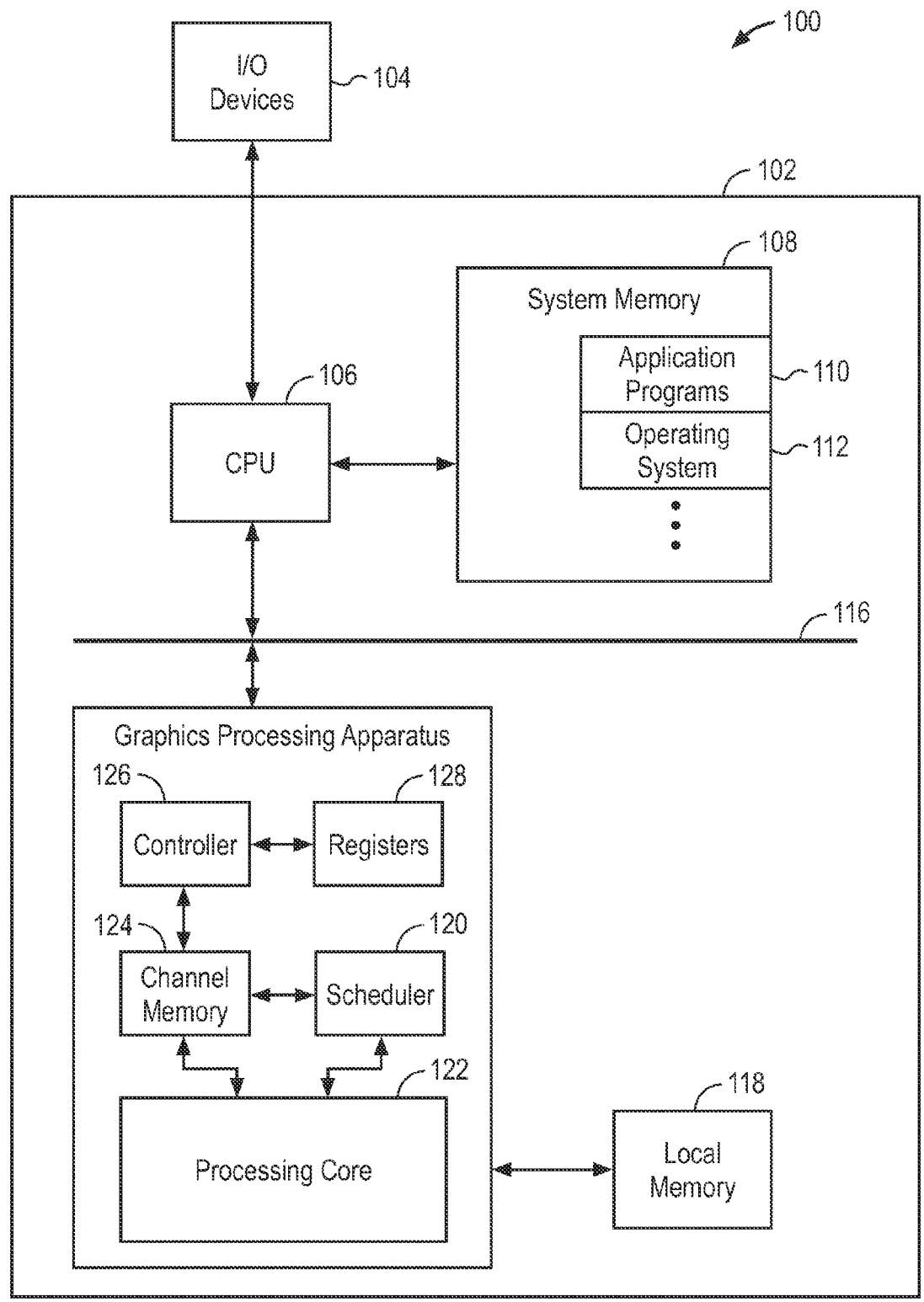
FIG. 1 illustrates a computer system including a graphics processing apparatus, according to an embodiment of the invention.

FIG. 1 illustrates a computer system 100 that is implemented in accordance with an embodiment of the invention. The computer system 100 includes a computer 102, which can be, for example, a desktop computer, a server computer, a laptop computer, a palm-sized computer, a tablet computer, a game console, a portable wireless terminal such as a personal digital assistant or a cellular telephone, a computer-based simulator, or any other device with data processing capability. As illustrated in FIG. 1, the computer 102 is connected to a set of Input/Output ("I/O") devices 104, which can include, for example, a keyboard, a mouse, and a display device, such as a television set, a Cathode Ray Tube monitor, or a Liquid Crystal Display monitor.

The computer 102 includes a Central Processing Unit ("CPU") 106, which is connected to a system memory 108. As illustrated in FIG. 1, the system memory 108 stores a set of application programs 110 and an operating system 112, which are further described below. The system memory 108 can be implemented using a Read-Only Memory ("ROM") and a Read-Write Memory ("RWM"), such as a Random Access Memory ("RAM"). In the illustrated embodiment, the computer 102 also includes a graphics processing apparatus 114 that is connected to the CPU 106 and the system memory 108 over a bus 116. The graphics processing apparatus 114 can be, for example, a GPU. As illustrated in FIG. 1, the graphics processing apparatus 114 is connected to a local memory 118, which can be, for example, a frame buffer. The local memory 118 can be implemented using a RWM, such as a RAM.

In the illustrated embodiment, the graphics processing apparatus 114 is implemented with multitasking capabilities so as to service multiple graphics processing channels related to the application programs 110. In particular, the graphics processing apparatus 114 includes a scheduler 120, which schedules servicing of the graphics processing channels using a common processing core 122. The scheduler 120 can be implemented using computer code, hardwired circuitry, or a combination of computer code and hardwired circuitry. The processing core 122 can be implemented with a Reduced Instruction Set Computer ("RISC")-like architecture, and can perform a number of operations related to rendering of two-dimensional and three-dimensional graphics. While a single processing core is illustrated in FIG. 1, it is contemplated that multiple processing cores can be included for another implementation.

Still referring to FIG. 1, the operating system 112 assigns a memory address space to each graphics processing channel to be serviced by the processing core 122. Assignment of a memory address space can also be performed by the graphics processing apparatus 114, such as using the scheduler 120. Each graphics processing channel is typically assigned a distinct memory address space, which stores contents related to execution of that graphics processing channel. However, it is also contemplated that multiple graphics processing channels can share a common memory address space. When servicing a particular graphics processing channel, the processing core 122 accesses and updates contents stored in a memory address space assigned to that graphics processing channel. Thus, for example, the processing core 122 can access and update an instance block stored in that memory address space.

Certain features of the computer system 100 described up to this point are conventional. However, unlike a conventional multitasking implementation, the illustrated embodiment provides a level of indirection to memory address spaces, such that those memory address spaces can be located virtually anywhere in memory. Thus, for example, since a fraction of graphics processing channels can be active during a particular time interval, memory address spaces for active graphics processing channels can be located in the local memory 118, thereby allowing fast access by the processing core 122. On the other hand, memory address spaces for inactive graphics processing channels need not be located in the local memory 118, but can be located in the system memory 108. Swapping of memory address spaces can be performed between the system memory 108 and the local memory 118, as previously active graphics processing channels become inactive, and as previously inactive graphics processing channels become active. In such manner, the illustrated embodiment allows efficient sharing of memory resources among multiple graphics processing channels, while removing limits imposed by the size of the local memory 118. Indeed, a large number of "virtual" graphics processing channels can be defined so as to include both active and inactive graphics processing channels. This number of "virtual" graphics processing channels can significantly exceed the number of graphics processing channels that can be defined in accordance with a conventional multitasking implementation.

In the illustrated embodiment, a level of indirection to memory address spaces is achieved by supplementing the graphics processing apparatus 114 with a channel memory 124, which is connected to the scheduler 120 and the processing core 122. The channel memory 124 can be implemented using a RWM, such as a RAM. The channel memory 124 stores a set of entries that allow mapping onto memory address spaces for graphics processing channels to be serviced. Each of the entries is related to a particular graphics processing channel, and is accessible using a particular index. During operation of the graphics processing apparatus 114, the scheduler 120 accesses the channel memory 124 and derives a run list that includes a set of indices. In particular, the scheduler 120 selects the indices so as to direct servicing of particular graphics processing channels, and then issues the run list including the indices to the processing core 122. In response to the run list, the processing core 122 accesses the channel memory 124 so as to identify locations of memory address spaces for the graphics processing channels to be serviced. In particular, the processing core 122 accesses particular entries in the channel memory 124 so as to correlate the indices with the locations of the memory address spaces.

As illustrated in FIG. 1, the channel memory 124 is connected to a controller 126, which loads and updates entries stored in the channel memory 124. Thus, for example, the controller 126 can update particular ones of the entries in response to swapping of memory address spaces between the system memory 108 and the local memory 118. In the illustrated embodiment, the controller 126 performs certain updates by accessing registers 128, which are further described below with reference to "snooping" capabilities of the graphics processing apparatus 114.

The foregoing provides an overview of an embodiment of the invention. Attention next turns to FIG. 2, which illustrates an example of the operation of the graphics processing apparatus 114.

Figure 2:
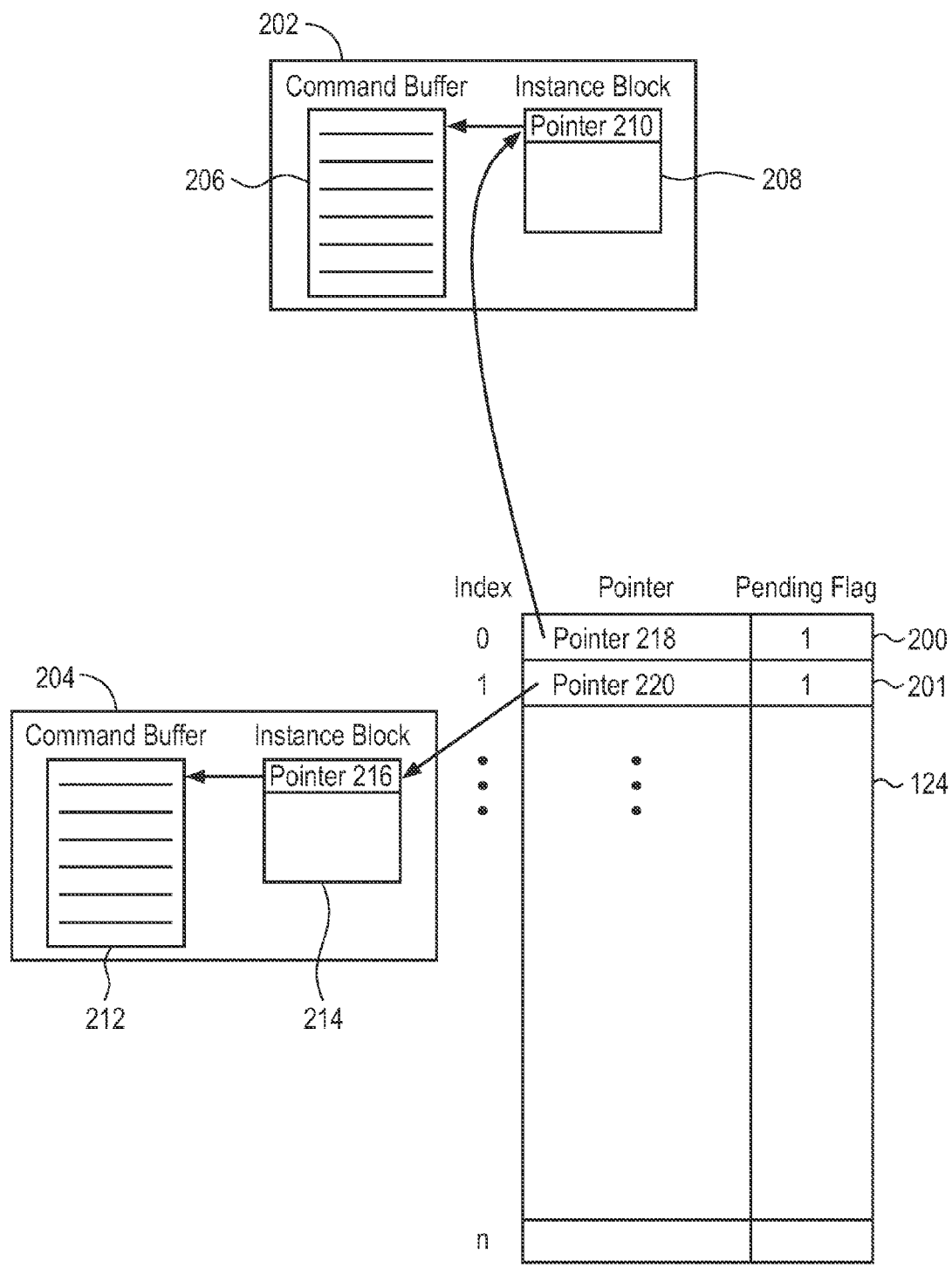
FIG. 2 illustrates operation of the graphics processing apparatus of FIG. 1.

In the illustrated example, each graphics processing channel to be serviced is assigned a distinct memory address space. In particular, a first graphics processing channel is assigned a memory address space 202, a second graphics processing channel is assigned a memory address space 204, and so on. As illustrated in FIG. 2, the memory address space 202 stores a command buffer 206, which includes a stream of commands. The memory address space 202 also stores an instance block 208 that includes execution state information, including a pointer 210 to the command buffer 206. Similarly, the memory address space 204 stores a command buffer 212 and an instance block 214, which includes a pointer 216 to the command buffer 212.

As illustrated in FIG. 2, the channel memory 124 stores (n+1) entries, including an entry 200 and an entry 201. Each entry includes contents related to a particular graphics processing channel, and is accessible using an index having a value between 0 and n. In particular, the entry 200 is accessed using an index of value 0, the entry 201 is accessed using an index of value 1, and so on. In some respects, an index for accessing an entry also serves as an identifier for a graphics processing channel that is related to that entry. In particular, the index of value 0 serves as an identifier for the first graphics processing channel that is related to the entry 200, the index of value 1 serves as an identifier for the second graphics processing channel that is related to the entry 201, and so on.

Still referring to FIG. 2, each entry in the channel memory 124 includes a pointer to a memory address space for a particular graphics processing channel. In particular, the entry 200 includes a pointer 218 to the instance block 208 for the first graphics processing channel, the entry 201 includes a pointer 220 to the instance block 214 for the second graphics processing channel, and so on. The use of pointers within the channel memory 124 provides a level of indirection to instance blocks, such that those instance blocks can be located virtually anywhere in memory. As can be appreciated, the use of the pointer 210 within the instance block 208 provides a further level of indirection, such that the command buffer 206 and the instance block 208 can be located at different places in memory. Similarly, the use of the pointer 216 within the instance block 214 allows the command buffer 212 and the instance block 214 to be located at different places in memory.

As illustrated in FIG. 2, each entry in the channel memory 124 also includes a pending flag for a particular graphics processing channel. A pending flag indicates whether there is any pending work for a particular graphics processing channel, and can be set to one of two logical values. For example, a pending flag can be set to a value of 1 if there is pending work, and a value of 0 if there is no pending work. The use of pending flags within the channel memory 124 allows scheduling of graphics processing channels to be performed based on work requirements of those graphics processing channels. Thus, for example, it can be desirable to select a particular graphics processing channel for servicing if there is pending work for that graphics processing channel. On the other hand, another graphics processing channel need not be selected for servicing if there is no pending work for that graphics processing channel.

In the illustrated example, setting of pending flags within the channel memory 124 is performed by "snooping" contents of the registers 128, which was previously described with reference to FIG. 1. Table 1 below sets forth an example of the contents of the register 128. Referring to Table 1 in conjunction with FIG. 2, GET(0) indicates an extent of execution of commands within the command buffer 206, while PUT(0) indicates an extent to which any additional commands have been stored within the command buffer 206. Thus, by comparing GET(0) and PUT(0), it can be determined whether any commands within the command buffer 206 remain to be executed, and a pending flag for the entry 200 can be set based on this comparison. Similarly, GET(1) indicates an extent of execution of commands within the command buffer 212, while PUT(1) indicates an extent to which any additional commands have been stored within the command buffer 212. A pending flag for the entry 201 can be set based on comparing GET(1) and PUT(1).

TABLE 1

.
.
.
GET(0)
PUT(0)
.
.
.
GET(1)
PUT(1)
.
.
.

It should be recognized that the specific embodiments of the invention described above are provided by way of example, and various other embodiments are encompassed by the invention. For example, with reference to FIG. 2, it should be recognized that a total number of graphics processing channels that can be defined need not be limited to the total number of entries in the channel memory 124. In particular, it is contemplated that assignments of the (n+1) entries can be swapped or substituted among a large number of graphics processing channels. As another example, each of the entries in the channel memory 124 can also include a valid flag for a particular graphics processing channel. A valid flag can indicate whether a particular graphics processing channel is currently active, and can have two logical values, such as a value of 1 if currently active, and a value of 0 if currently inactive.

Some embodiments of the invention relate to a computer storage product with a computer-readable medium having instructions or computer code thereon for performing various computer-implemented operations. The media and computer code may be those specially designed and constructed for the purposes of the invention, or they may be of the kind well known and available to those having skill in the computer software arts. Examples of computer-readable media include, but are not limited to: magnetic storage media such as hard disks, floppy disks, and magnetic tape; optical storage media such as Compact Disc/Digital Video Discs ("CD/DVDs"), Compact Disc-Read Only Memories ("CD-ROMs"), and holographic devices; magneto-optical storage media such as floptical disks; carrier wave signals; and hardware devices that are specially configured to store and execute program code, such as Application-Specific Integrated Circuits ("ASICs"), Programmable Logic Devices ("PLDs"), and ROM and RAM devices. Examples of computer code include, but are not limited to, micro-code or micro-instructions, machine instructions, such as produced by a compiler, and files containing higher-level instructions that are executed by a computer using an interpreter. For example, an embodiment of the invention may be implemented using Java, C++, or other object-oriented programming language and development tools. Additional examples of computer code include, but are not limited to, control signals, encrypted code, and compressed code.

Some embodiments of the invention can be implemented using computer code in place of, or in combination with, hardwired circuitry. For example, with reference to FIG. 1, various components of the computer system 100 can be implemented using computer code, hardwired circuitry, or a combination thereof.

While the invention has been described with reference to the specific embodiments thereof, it should be understood by those skilled in the art that various changes may be made and equivalents may be substituted without departing from the true spirit and scope of the invention as defined by the appended claims. In addition, many modifications may be made to adapt a particular situation, material, composition of matter, method, process operation or operations, to the objective, spirit and scope of the invention. All such modifications are intended to be within the scope of the claims appended hereto. In particular, while the methods disclosed herein have been described with reference to particular operations performed in a particular order, it will be understood that these operations may be combined, sub-divided, or re-ordered to form an equivalent method without departing from the teachings of the invention. Accordingly, unless specifically indicated herein, the order and grouping of the operations is not a limitation of the invention.

What is claimed is:

1. A graphics processing apparatus, comprising:
   a scheduler configured to direct servicing of a first graphics processing channel by issuing a first index related to the first graphics processing channel; and
   a processing core connected to the scheduler, the processing core configured to service the first graphics processing channel by:
      correlating the first index with a first pointer to a first memory location at which a first instance block for the first graphics processing channel is stored, the first instance block including execution state information and a second pointer to a second memory location at which a command buffer for the first graphics processing channel is stored;
      using the first pointer, accessing the first instance block stored at the first memory location;
      retrieving the second pointer of the command buffer from the first instance block; and
      using the second pointer, accessing the command buffer stored at the second memory location.

2. The graphics processing apparatus of claim 1, further comprising:

a channel memory connected to the processing core, the channel memory configured to provide a mapping between the first index and the first pointer.

3. The graphics processing apparatus of claim 2, wherein the processing core is configured to correlate the first index with the first pointer by accessing the channel memory.

4. The graphics processing apparatus of claim 1, wherein the scheduler is configured to direct servicing of a second graphics processing channel by issuing a second index related to the second graphics processing channel.

5. The graphics processing apparatus of claim 4, wherein the processing core is configured to service the second graphics processing channel by:
   correlating the second index with a third pointer to a third memory location at which a second instance block for the second graphics processing channel is stored; and
   using the third pointer, accessing the second instance block stored at the third memory location.

6. The graphics processing apparatus of claim 5, wherein the first memory location is included in a first memory, and the third memory location is included in a second memory that is distinct from the first memory.

7. A graphics processing method, comprising:
   scheduling a first thread of execution by issuing a first index related to the first thread of execution; and
   servicing the first thread of execution by:
      using a first pointer to a first memory address space related to the first thread of execution, mapping the first index onto the first memory address space;
      accessing contents stored in the first memory address space, the contents including execution state information and a second pointer to a second memory address space related to a command buffer for the first thread of execution;
      using the second pointer, mapping the contents stored in the first memory address space onto the second memory address space; and
      accessing the command buffer stored in the second memory address space.

8. The graphics processing method of claim 7, wherein scheduling the first thread of execution includes determining whether there is any pending work related to the first thread of execution.

9. The graphics processing method of claim 7, further comprising:
   scheduling a second thread of execution by issuing a second index related to the second thread of execution; and
   servicing the second thread of execution by:
      using a third pointer to a third memory address space related to the second thread of execution, mapping the second index onto the third memory address space; and
      accessing contents stored in the third memory address space.

* * * * *